(12) United States Patent
Davie et al.

(10) Patent No.: US 9,968,950 B2
(45) Date of Patent: May 15, 2018

(54) TWIN BOOM SPRINKLER

(71) Applicant: Trent F. Davie, Pickering (CA)

(72) Inventors: Trent F. Davie, Pickering (CA); Robert G. Dickie, King City (CA)

(73) Assignee: Trent F. Davie, Pickering, Ontario (CA)

(*) Notice: Subject to any disclaimer, the term of this patent is extended or adjusted under 35 U.S.C. 154(b) by 49 days.

(21) Appl. No.: 15/287,809

(22) Filed: Oct. 7, 2016

(65) Prior Publication Data
US 2018/0099297 A1 Apr. 12, 2018

(51) Int. Cl.
B05B 3/16 (2006.01)
B05B 3/14 (2006.01)
B05B 3/02 (2006.01)
B05B 3/04 (2006.01)
B05B 1/20 (2006.01)
A01M 7/00 (2006.01)
A47L 15/42 (2006.01)

(52) U.S. Cl.
CPC ............... B05B 3/14 (2013.01); A01M 7/005 (2013.01); A47L 15/4282 (2013.01); B05B 1/20 (2013.01); B05B 3/025 (2013.01); B05B 3/044 (2013.01); B05B 3/0422 (2013.01); B05B 3/0495 (2013.01)

(58) Field of Classification Search
CPC ......... B05B 3/14; B05B 3/025; B05B 3/0422; B05B 3/0495; B05B 3/044; B05B 1/20; A47L 15/4282; A47L 15/18; A01M 7/005
USPC ....... 239/237, 240, 242, 243, 244, 245, 255, 239/450, 536
See application file for complete search history.

(56) References Cited

U.S. PATENT DOCUMENTS

| 2,693,390 | A | * | 11/1954 | Spender | B05B 3/0454 239/240 |
| 2,943,796 | A |   | 7/1960  | Smith   |  |
| 3,115,305 | A |   | 12/1963 | Rinkewich |  |
| 3,282,509 | A | * | 11/1966 | Starr   | B05B 3/044 239/242 |
| 3,332,624 | A |   | 7/1967  | Rinkewich |  |
| 3,680,783 | A |   | 8/1972  | Springer |  |
| 3,767,118 | A | * | 10/1973 | Oberto  | B05B 3/044 239/242 |
| 4,632,313 | A | * | 12/1986 | Rinkewich | B05B 1/1654 239/242 |
| 6,334,577 | B1 | * | 1/2002 | Chih    | A62C 31/02 239/242 |
| 6,568,603 | B2 | * | 5/2003 | Chao    | B05B 1/1627 239/242 |

* cited by examiner

Primary Examiner — Steven J Ganey
(74) Attorney, Agent, or Firm — Sand & Sebolt

(57) ABSTRACT

An oscillating sprinkler that includes a frame with a first boom and a second boom engaged therewith. The booms are oriented generally parallel to each other and each of the first and second booms rotates about an axis that extends along the boom's length of the respective first or second boom. The first and second booms rotate in opposite directions to each other and are synchronized so that they rotate toward each other or away from each other in unison. First and second booms are operatively engaged with gears that are driven by a water-powered motor. One or more valves may be provided to shut off or reduce water flow from one or both of the booms. The watering pattern from the booms is such that water tends to be more evenly distributed over a ground surface upon which the sprinkler is placed.

20 Claims, 16 Drawing Sheets

——— FIRST BOOM PATTERN
-------- SECOND BOOM PATTERN

TWIN BOOM SPRINKLER

BACKGROUND OF THE INVENTION

Technical Field

The present invention generally relates to lawn sprinklers. More particularly, the invention is directed to an oscillating lawn sprinkler that has two spray booms. Specifically, the invention relates to a twin boom lawn sprinkler where the booms are geared together and move in opposite directions and where the booms have staggered openings through which water flows so as to avoid interference in water flow patterns from the booms.

Background Information

Oscillating sprinklers are just one of a number of different types of sprinkler that may be used to water grassy areas. Oscillating sprinklers typically include a single boom that rotates back and forth about an axis that extends along the length of the boom. The boom defines a plurality of openings therein and water fed by a garden hose to the sprinkler flows out of these openings. The provision of just a single boom limits the rate at which water can be applied to the grassy area and it can be quite time consuming to use this type of sprinkler to water a large area of grass.

In an effort to reduce the time required to water a large area of grass it has been proposed in the art to provide an oscillating sprinkler that has two spaced apart and generally parallel booms. One such device is the twin boom sprinkler disclosed in U.S. Pat. No. 2,943,796 (Smith). Smith's sprinkler has two booms that are dependent upon each other and can only be rotated in the same direction. The booms are operatively engaged with a single drive mechanism and are connected to each other via a link bar. So, when the drive mechanism rotates a first of the booms, the link bar transfers the motion to the second of the booms. The Smith sprinkler has the disadvantages of the two booms watering substantially the same area of grass and the tendency of water pooling at regions of the grassy area that correspond to stall points in the rotation of the sprinkler's booms. There is therefore an uneven distribution of water applied to the watered grassy area. Because of this uneven distribution, the user frequently has to move the sprinkler to a position where a new watering pattern will overlap areas that are already watered. This again has a tendency to cause water to pool in already watered areas of grass, uneven distribution of water in the newly watered region and consequent wastage of water and time.

U.S. Pat. No. 3,115,305 (Rinkewich) also discloses a twin boom sprinkler where the relative positions of the booms may be adjusted so that the watering pattern of the sprinkler can be changed. The booms again oscillate in the same direction and the sprinkler consequently is unable to evenly distribute water over a region being watered and there remains a tendency for water from the sprinkler to pool at stall points in the rotation of the booms.

SUMMARY

There is therefore a need in the art for a sprinkler that tends to more evenly distribute water over an area being watered, and which leads to a reduction in water pooling and consequent wastage of water.

The twin boom oscillating sprinkler disclosed herein addresses some of the deficiencies in prior art devices and is designed to create a more even watering pattern so that a lawn will tend to require less watering in order to cause areas of the lawn to reach a desired moisture level without requiring overwatering of some areas of the lawn.

In one aspect, the invention may provide an oscillating sprinkler comprising a frame, a first boom engaged with the frame, a second boom engaged with the frame; wherein the booms are oriented generally parallel to each other and each of the first and second booms rotates about an axis that extends along a length of the respective first or second boom; and wherein the first and second booms rotate in opposite directions to each other. In accordance with another aspect of the invention the first and second booms rotate in synchrony with each other.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Referring to FIGS. 1-14 there is shown a lawn sprinkler in accordance with the present invention, generally indicated at 10. Sprinkler 10 comprises a Frame 12 that supports and covers much of the sprinkler mechanism 14 (FIG. 2). Sprinkler mechanism 14 includes a motor assembly 16, a water flow manifold 18 and first and second booms 20, 22.

Figure 1:
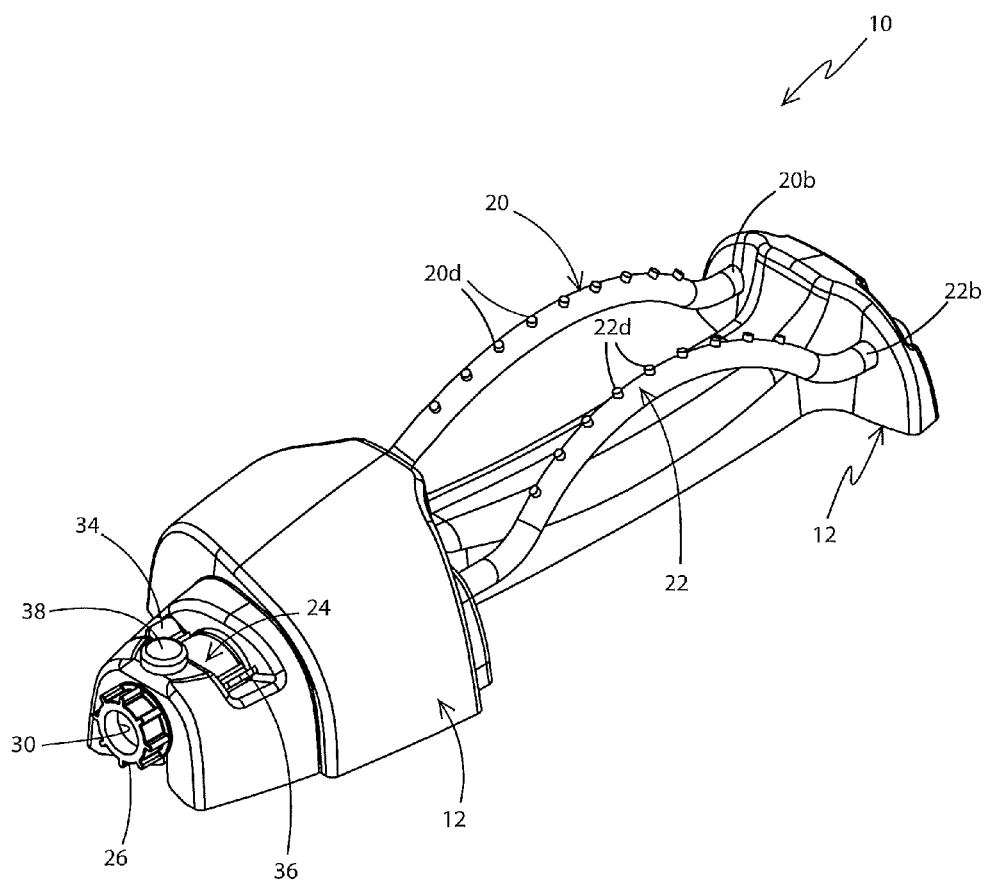
FIG. 1 is a perspective view of a twin boom sprinkler in accordance with an aspect of the present invention.
Figure 2:
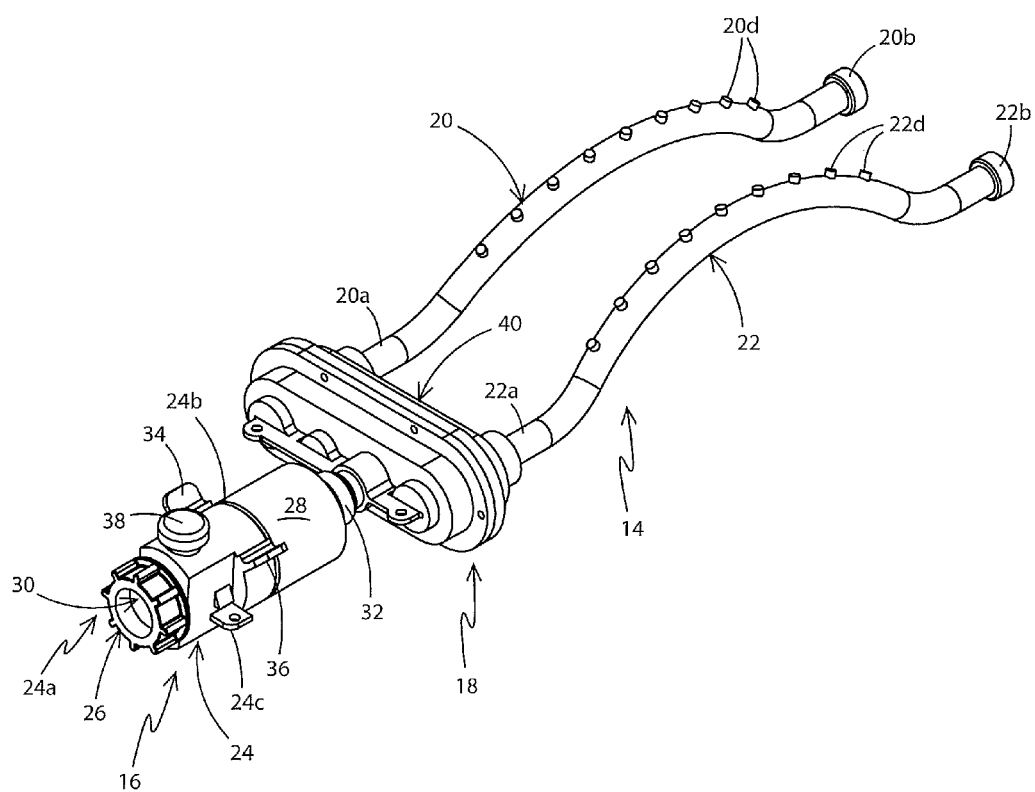
FIG. 2 is a perspective view of the sprinkler with the frame removed therefrom.
Figure 5:
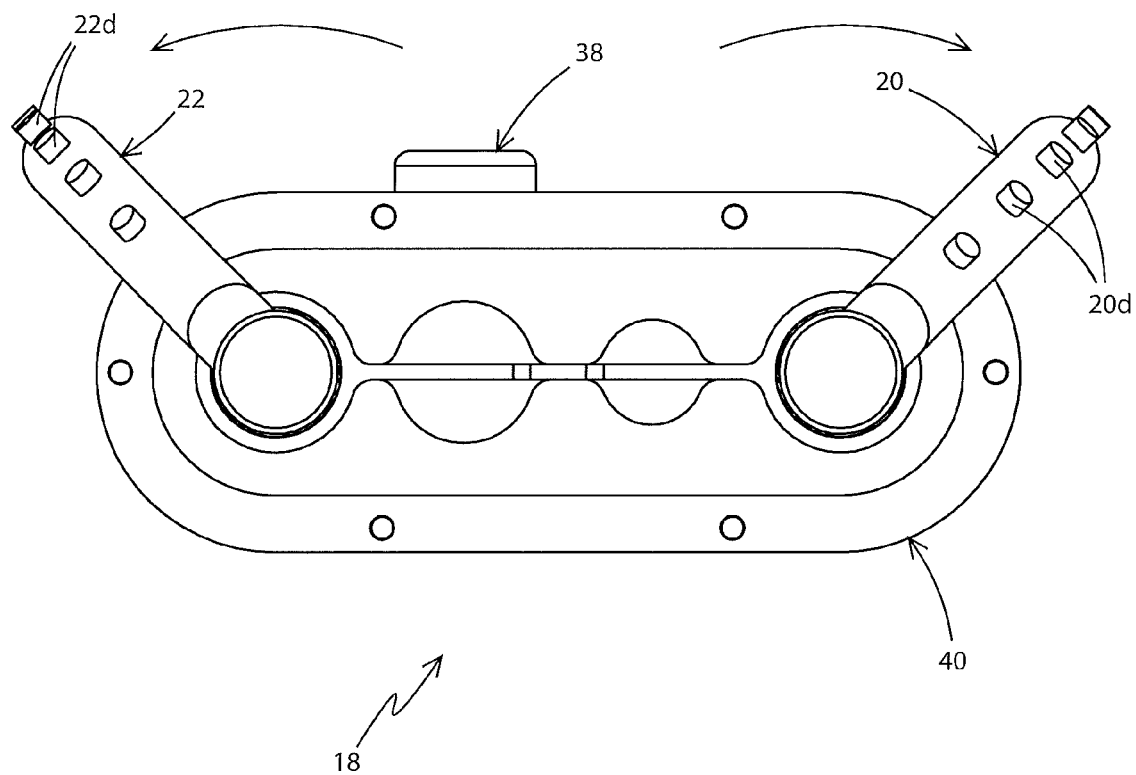
FIG. 5 is a right end view of the sprinkler with the first and second booms shown oscillating away from each other.
Figure 6:
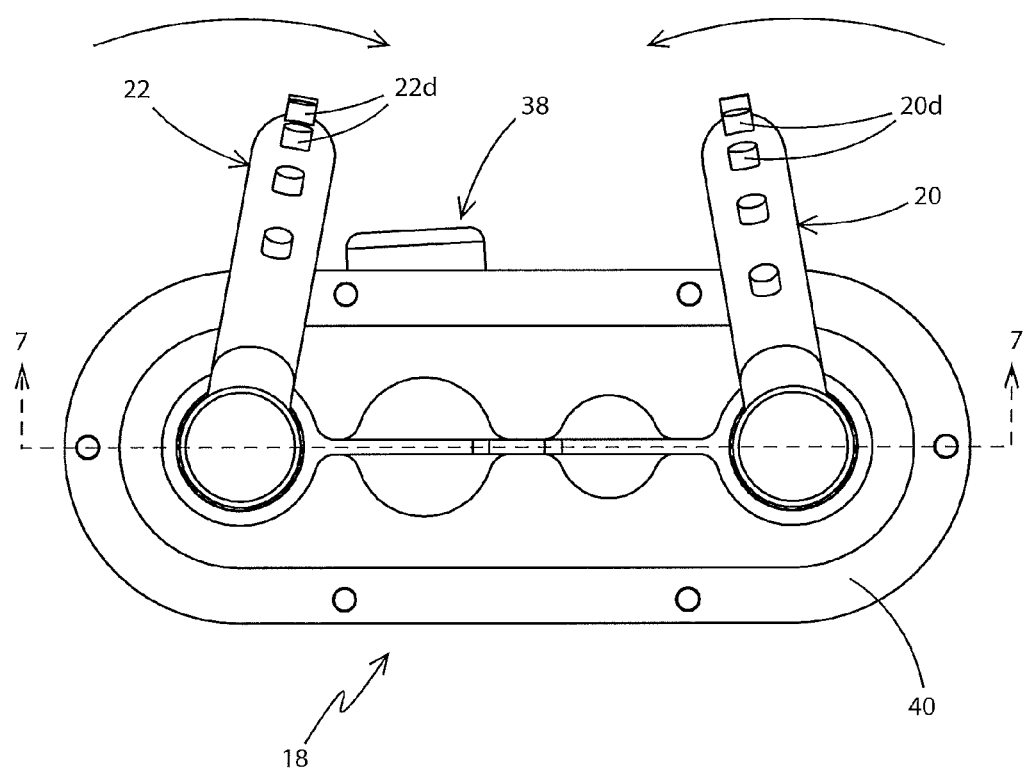
FIG. 6 is a right end view of the sprinkler with the first and second booms shown oscillating toward each other.

Referring to FIGS. 1 and 2, motor assembly 16 includes a housing 24 that has a first end and a second end generally indicated by the reference numbers 24a and 24b, respectively. Flanges 24c extend outwardly from exterior surface of housing 24 and may be provided to secure housing 24 to frame 12. A hose inlet 26 is provided at first end 24a of housing 24. Motor assembly 16 also includes a drive mechanism for oscillating first and second booms 20, 22 in opposite directions relative to each other. FIG. 5 shows first and second booms 20, 22 rotating outwardly away from each other. FIG. 6 shows first and second booms 20, 22 rotating inwardly toward each other.

The drive mechanism utilized in sprinkler 10 may be of any suitable type and may take the form of a motor 28. Motor 28 may be provided at second end 24b of housing 24. A bore 30 may extend through housing 24 and motor 28 from inlet 26 to an outlet 32 provided on motor 28. Inlet 26 is configured to be engaged with a standard garden hose and when so connected, water from the garden hose is able to flow through bore 30 and through motor 28. Motor 28 may be of any known type used in oscillating sprinklers and may be a hydraulic motor that has an impeller in its internal water flow. Motor 28 illustrated herein may be quite complex and have an adjustable left and right limit stop that reverses the direction of the motor when these limits are hit. The motor 28 may include a complex two-way valve inside motor 28 that hits the adjustable mechanical limits and reverses the motor direction. Motor 28 may be hydraulically actuated. When actuated by water flowing into sprinkler 10, motor 28 causes rotation in gears 42-48 and thereby causes first and second booms 20, 22 to rotate.

Motor assembly 16 may further include a left limit adjuster 34 and a right limit adjuster 36 that may be adjusted to control the range of the water flowing from first and second booms 20, 22. The limit adjusters 34, 36 and their use will be discussed later herein.

Motor assembly 16 may further include one or more valves to reduce or shut off the flow of water through bore 30 to one or both of the first and second booms 20, 22. One valve 38 is shown in the attached figures. By way of example only, valve 38 may be a ball-stop type valve. It will be understood, however, that any other suitable type of valve may be used in sprinkler 10 to reduce or stop the flow of water through bore 30. Valve 38 may be selectively engaged to cause the flow of water through sprinkler 10 to be either on or off. Alternatively, valve 38 may operate in a spectral fashion such that the water pressure in one or both of first and second booms 20, 22 is reduced and thereby the water flow from booms 20, 22 may be reduced but not shut off. Valve 38 may be of a type that allows for graduated reduction of water flow so that the user may select how much water may flow from one or the other of first and second booms 20, 22.

Figure 8:
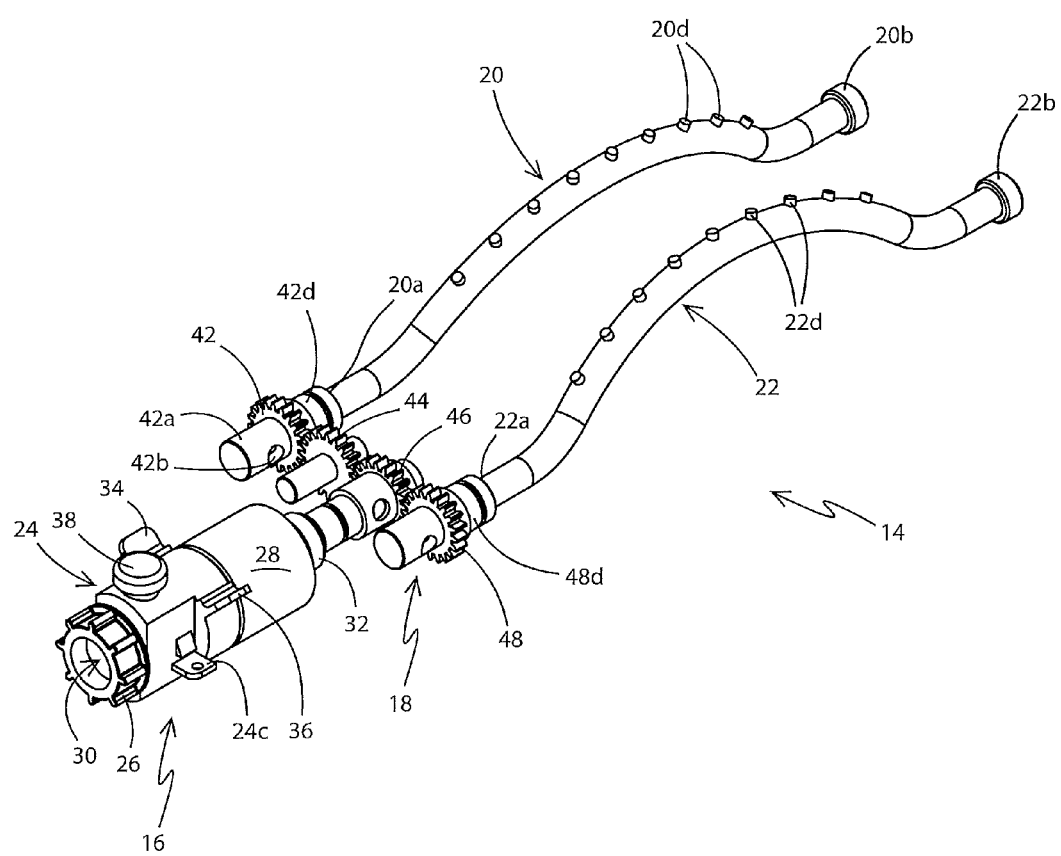
FIG. 8 is a perspective view of the sprinkler with the hose inlet cover removed and showing the gearing engaging the first and second booms together.
Figure 9:
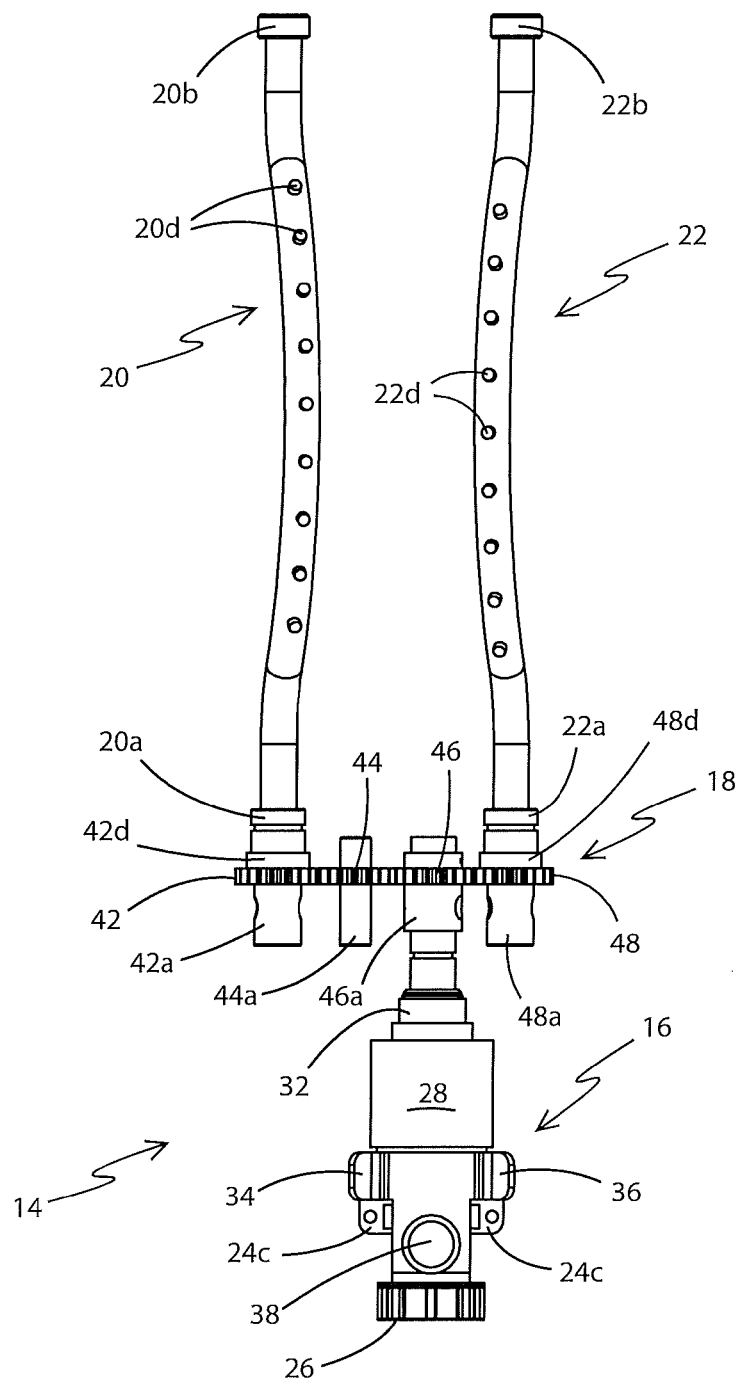
FIG. 9 is a top view of the sprinkler shown in FIG. 8.
Figure 10:
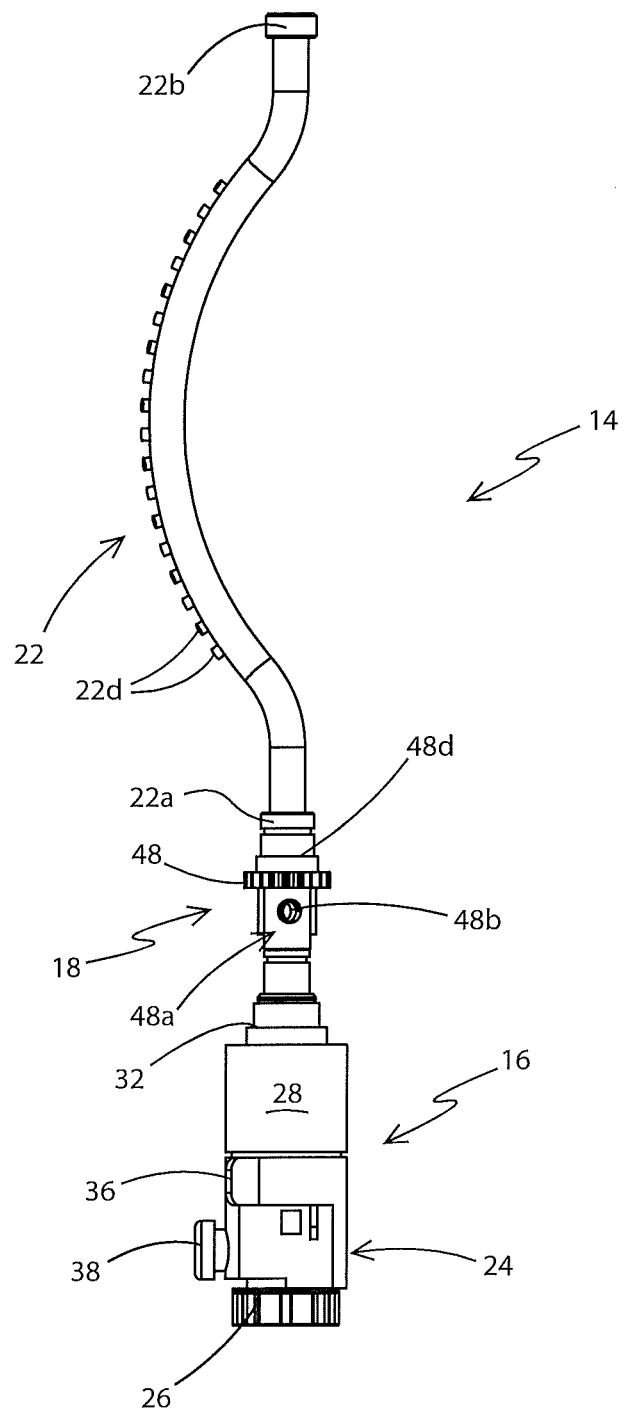
FIG. 10 is a side view of the sprinkler shown in FIG. 8.
Figure 11:
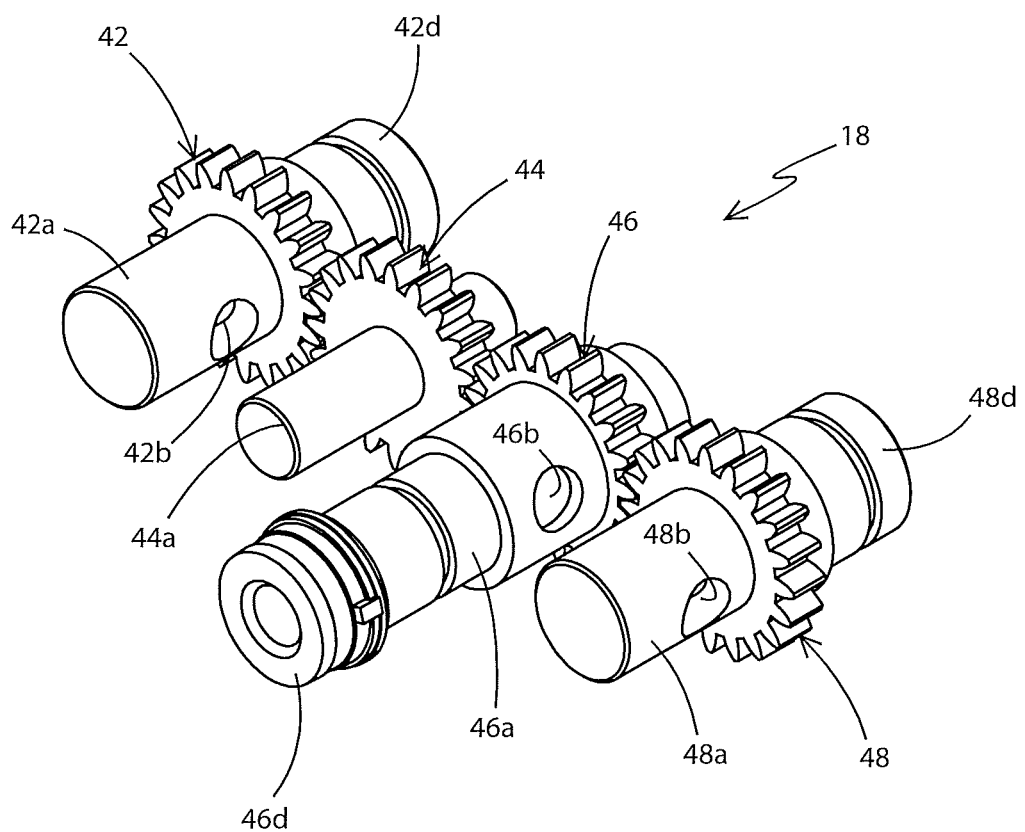
FIG. 11 is a perspective view of the gears only.
Figure 12:
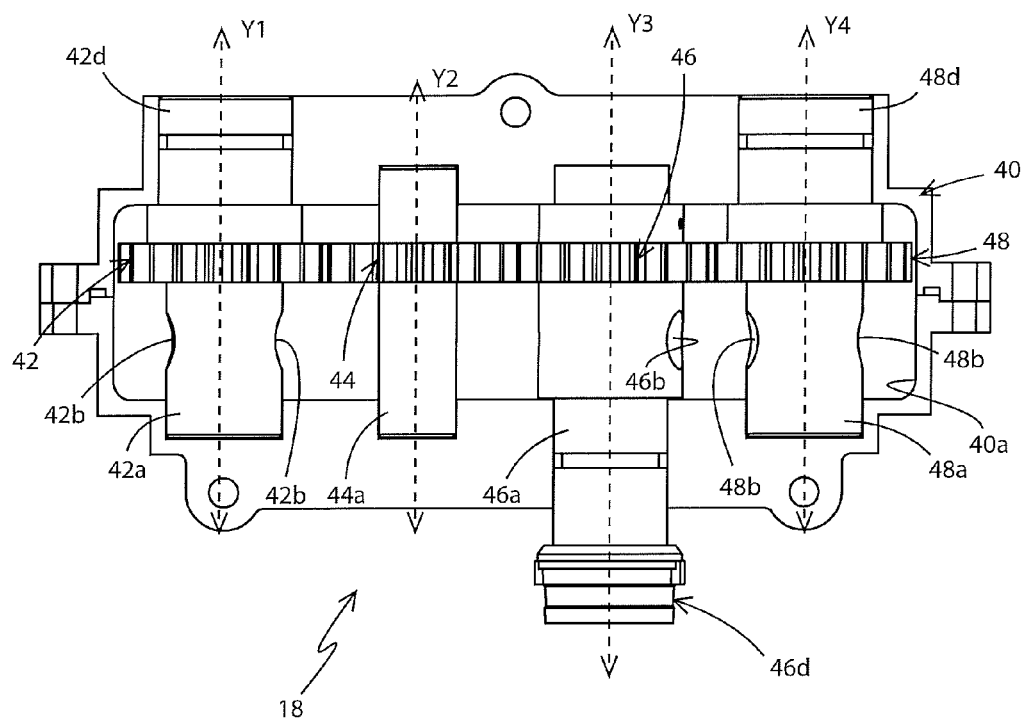
FIG. 12 is a top view of the gears.
Figure 13:
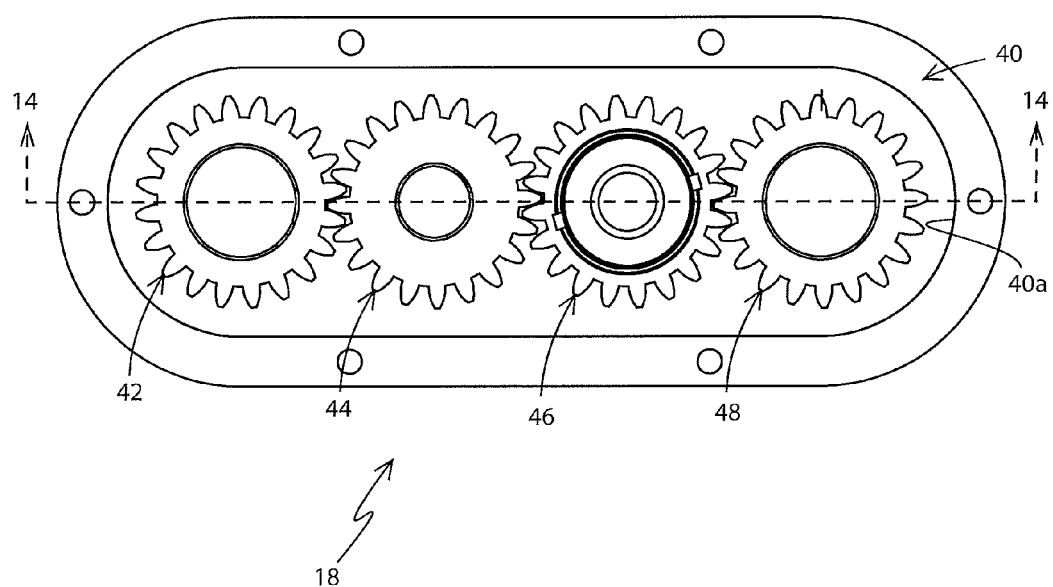
FIG. 13 is an end view of the gears.
Figure 14:
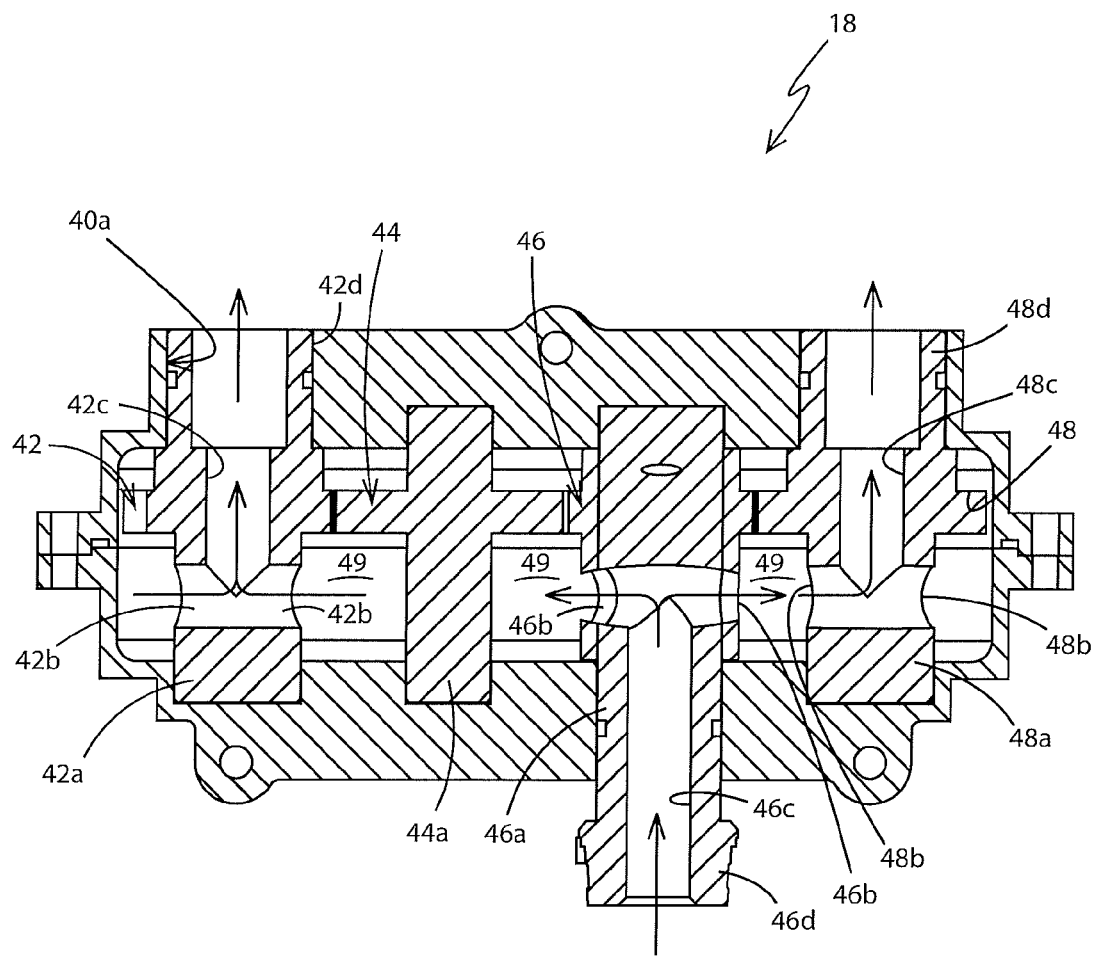
FIG. 14 is a cross-section through the gears taken along line 14-14 of FIG. 13.

In accordance with an aspect of the present invention, water flow manifold 18 is operatively engaged between motor 28 and first and second booms 20, 22. Water flow manifold 18 includes a cover 40 that surrounds and protects a plurality of gears 42, 44, 46, 48 (FIG. 8). Third gear is connected to the motor and is rotated thereby. Third gear 46 engages the second gear 44 which in turn engages the first gear 42, and first gear 42 is engaged with first boom 20. Third gear 46 engages fourth gear 48 which engages the second boom 22. Second gear 44 and third gear 46 are configured to rotate in opposite directions to each other.

First gear 42 rotates about an axis "Y1" (FIG. 12) that extends along a gear hub 42a. Gear hub 42a defines a pair of aligned openings 42b (FIG. 14) therein that are oriented at right angles to axis "Y1". Openings 42b are in fluid communication with a channel 42c that is defined in gear hub 42a and channel 42c extends generally along axis "Y1".

Second gear 44 rotates about an axis "Y2" that extends along a gear hub 44a. Axis "Y2" is parallel to axis "Y1".

Third gear 46 rotates about an axis "Y3" that extends along a gear hub 46a. Axis "Y3" is parallel to axis "Y1". Gear hub 46a defines a pair of aligned openings 46b therein that are oriented at right angles to axis "Y3" and may be aligned with openings 42b. Openings 46b are in fluid communication with a channel 42c that is defined in gear hub 42a and the channel 42c extends generally parallel to axis "Y3".

Fourth gear 48 rotates about an axis "Y4" that extends along a gear hub 48a. Gear hub 48a defines a pair of aligned openings 48b (FIG. 14) therein that are oriented at right angles to axis "Y4". Openings 48b are in fluid communication with a channel 48c that is defined in gear hub 48a and channel 48c extends generally along axis "Y4". Openings 46b are in fluid communication with a channel 48c that is defined in gear hub 48a and the channel 48c extends generally parallel to axis "Y4".

Figure 7:
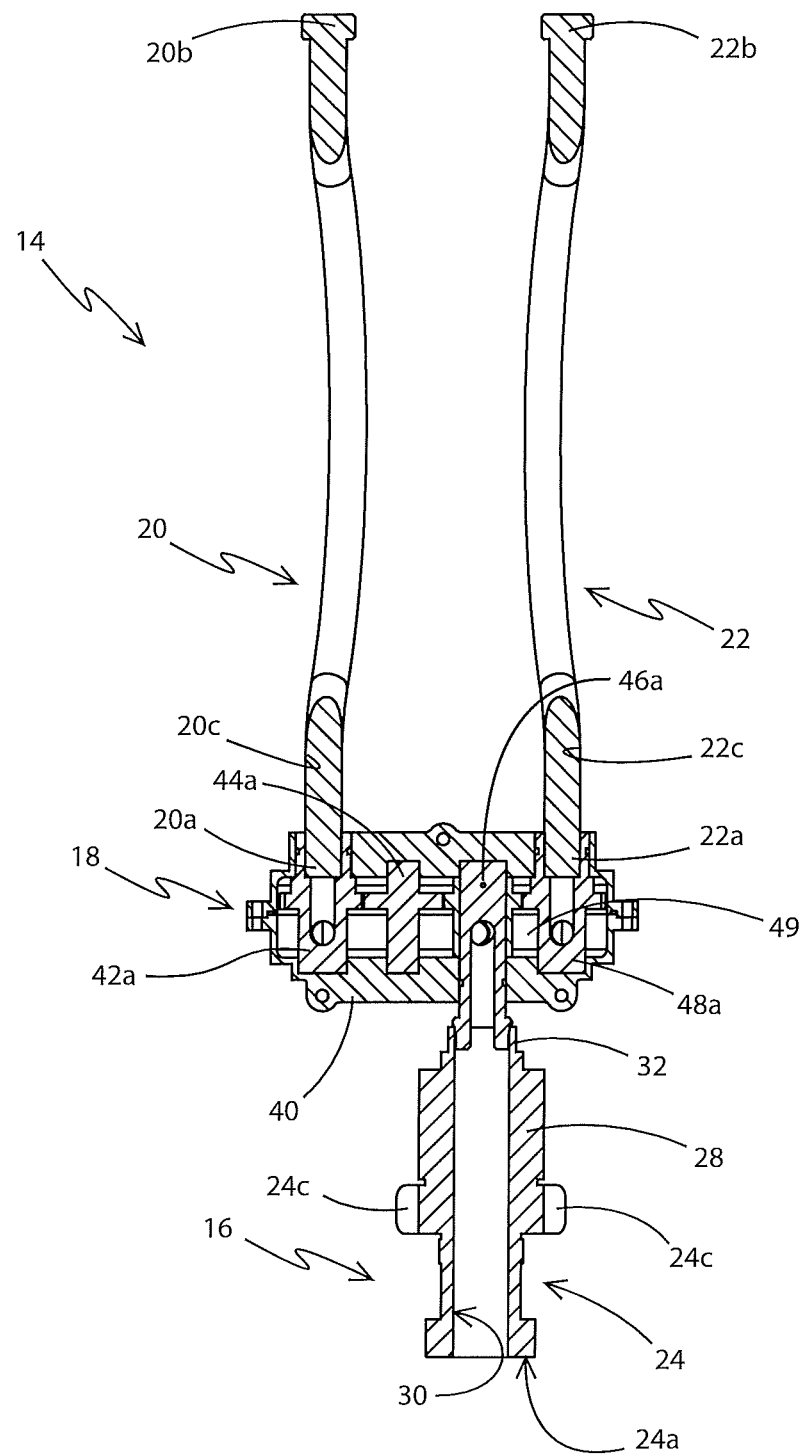
FIG. 7 is a cross-section through the sprinkler with the frame removed.

First boom 20 has a first end 20a, a second end 20b and a channel 20c that extends through the interior of first boom 20 from first end 20a to a region located a distance from second end 20b. A plurality of spaced-apart openings 20d is defined in a first boom 20 and these openings 20d are in fluid communication with channel 20c. Openings 20d may simply be holes defined in the exterior wall of the first boom 20 or may be holes provided in small nozzle-type structures that extend outwardly from the exterior wall of the first boom. It will be understood that while only a single row of openings 20d are defined in first boom 20, a plurality of rows of openings may be defined therein, or a plurality of openings that are not arranged in rows may be provided in first boom. First end 20a of first boom 20 is engaged with a connector 42d on gear hub 42a of first gear 42. When so engaged, channel 20c is in fluid communication with channel 42c in gear hub 42a. When a garden hose is connected to sprinkler 10 via hose inlet 26 and the water is switched on, water will flow out of the hose and into bore 30 in motor assembly 16 and flow through motor 28 and out of outlet 32 and into water manifold 18. Water flowing through housing 40 of water manifold 18 will flow into channel 20c in first boom 20 via channel 42c in first gear hub 42a and will flow into channel 22c in second boom 22 via channel 48c in fourth gear hub 48a. It should be noted that FIG. 7 shows spaces 49 around gears 42-48 in housing 40 into and through which water may flow. Water flowing through housing 40 tends to be under pressure because of the restricted passageways through bore 30, channels 46b, spaces 49, channels 42b, 42c, 48b, 48c, and channels 20c, 22c.

Second boom 22 has a first end 22a, a second end 22b and a channel 22c that extends through the interior of second boom 22 from first end 22a to a region located a distance from second end 22b. A plurality of spaced-apart openings 22d is defined in second boom 22; where openings 22d are in fluid communication with channel 22c. Openings 22d may simply be holes defined in the exterior wall of the second boom 22 or may be holes provided in small nozzle-type structures that extend outwardly from the exterior wall of the second boom 22. It will be understood that while only a single row of openings 22d are defined in second boom 22, a plurality of rows of openings may be defined therein, or a plurality of openings that are not arranged in rows may be provided in second boom. First end 22a of second boom 22 is engaged with a connector 48d on gear hub 48a of fourth gear 48. When so engaged, channel 22c is in fluid communication with channel 48c in fourth gear hub 48a. Water flowing through housing 40 may flow into channel 22c in second boom 22 via channel 48c in fourth gear hub 48a.

Figure 3:
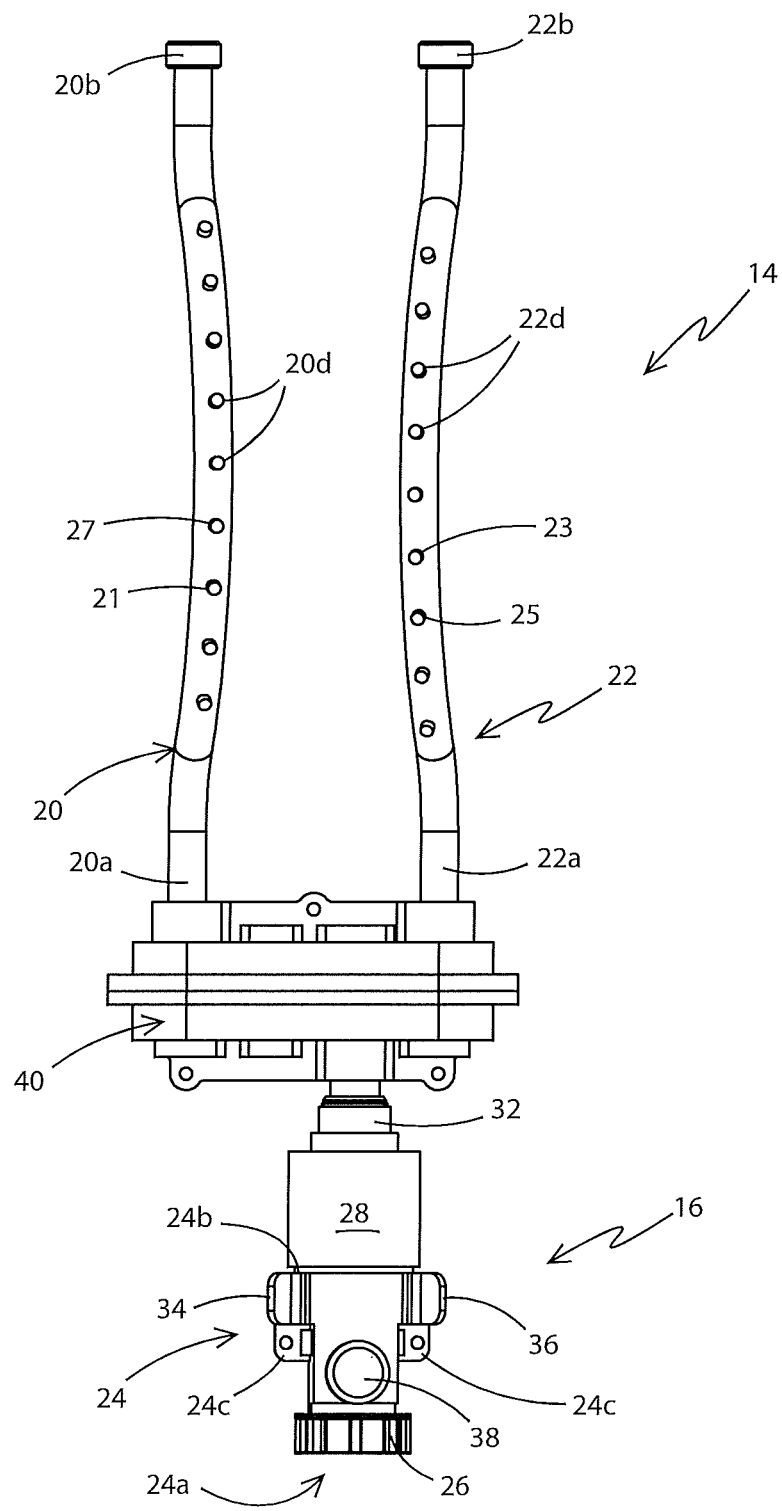
FIG. 3 is a top view of the sprinkler with the frame removed therefrom.
Figure 4:
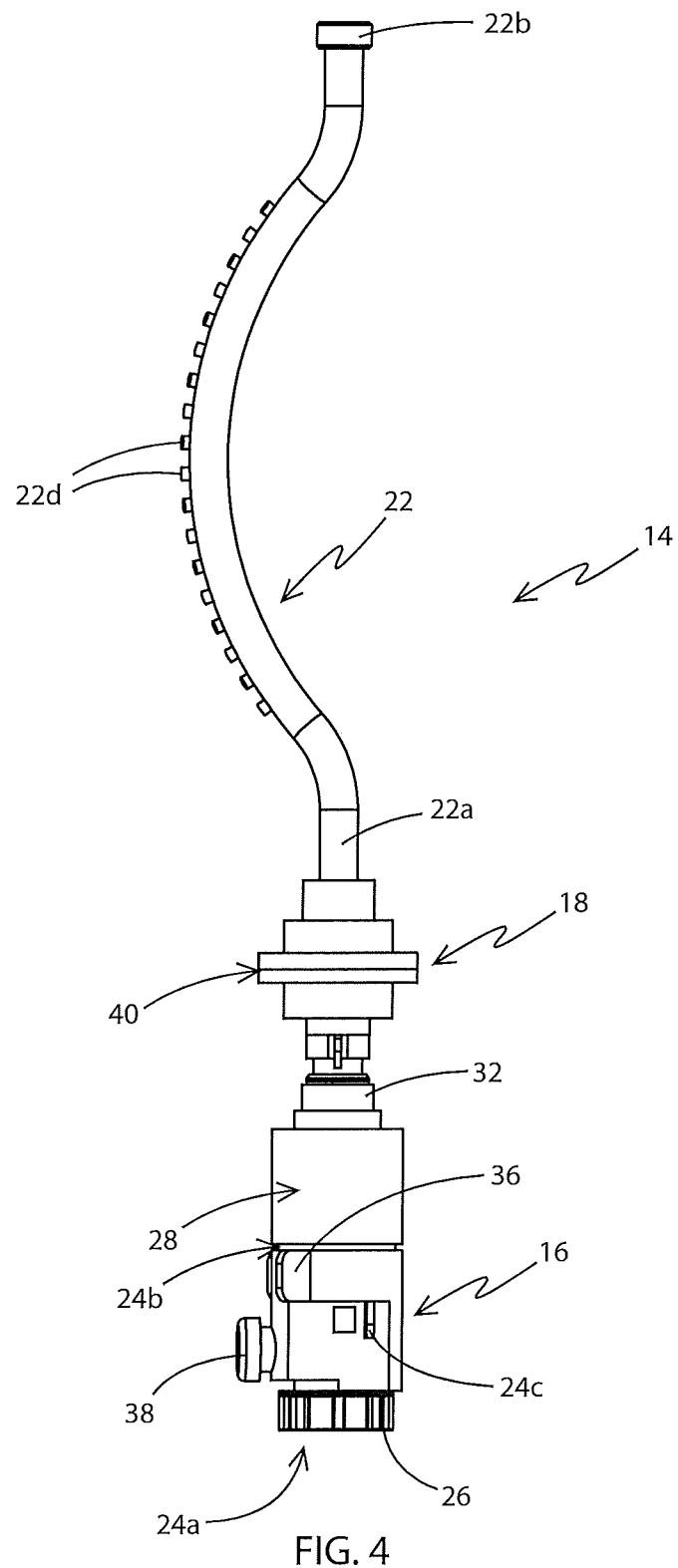
FIG. 4 is a side view of the sprinkler of FIG. 2.

It should be noted that openings 20d in first boom 20 are staggered with respect to openings 22d in second boom 22. The first openings 20d are positioned on first boom 20 in such a way that first openings 20d are out of alignment with second openings 22d on second boom 22. In other words, each opening 20d in first boom 20 is not laterally aligned with any openings 22d in second boom 22. This is illustrated in FIG. 3 where it can be seen that opening 21 on first boom 20 is located laterally between openings 23 and 25 on second boom 22. Furthermore, opening 23 on second boom 22 is located laterally between openings 21 and 27 on first boom 20. The figure shows the misalignment or staggering of openings 21 and 27 with openings 23 and 25. This staggered pattern of openings exists along substantially the entire lengths of first and second booms 20, 22 (where the length is measured from the respective first ends 20a, 22a to the respective second ends 20b, 22b). These staggered openings 20d, 22d aid in ensuring that the water streams flowing from the openings 20d, 22d are substantially prevented from interfering with each other as the water streams cross when first and second booms 20, 22 rotate toward each other or away from each other.

Gear hub 46a of third gear 46 has a connector 46d that is engaged with outlet 32 on motor 28 and third gear 46 is driven by motor 28. (It will be understood that instead of third gear 46 being operatively engaged with motor 28, second gear 44 may be engaged with motor 28 and be driven thereby. Still further, the motor 28 may drive first gear 42 or fourth gear 48.) When third gear 46 is engaged with motor 28, channel 46c in third gear hub 46a is placed in fluid communication with bore 30 through motor assembly 16. As shown in FIG. 7, water flows through bore 30 and is driven by motor 28 into channel 46c of the gear hub 46a. Water flows through channel 46c and out of openings 46b into the spaces 49. Water flows from spaces 49 into openings 42b in gear hub 42a of first gear 42, through channel 42c, into channel 20c of first boom 20 and finally out through openings 20d therein. Water also flows from spaces 49 into openings 48b in gear hub 48a of fourth gear 48, through channel 48c, into channel 22c of second boom 22 and then out of the openings 22d therein.

Gears 42-48 are configured such that second and third gears 44, 46 will rotate in opposite direction and therefore will cause first and fourth gears 42, 48 to rotate in opposite directions. This in turn will result in first and second booms 20, 22 rotating in opposite directions from each other. First and second booms 20, 22 will either rotate inwardly toward each other or rotate outwardly away from each other. First and second booms 20, 22 are not geared in a manner that will cause them to rotate in the same direction at the same time.

Gears 42-48 may be comprised of plastic and are positioned within the interior of the housing 40 of manifold 18. Water flowing through manifold 18 helps to keep dirt and mud off gears 42-48 and the water acts as a lubricant to gears 42-48. Housing 40 is a watertight housing that provides a flow path to each of the first and second booms 20. 22.

By powering intermediate third gear 46, the water flow is more balanced to each of the first and second booms 20, 22 and the aesthetics of sprinkler 10 are more pleasing than would be the case if one of the end gears, namely first gear 42 or fourth gear 48, were powered.

Figure 15:
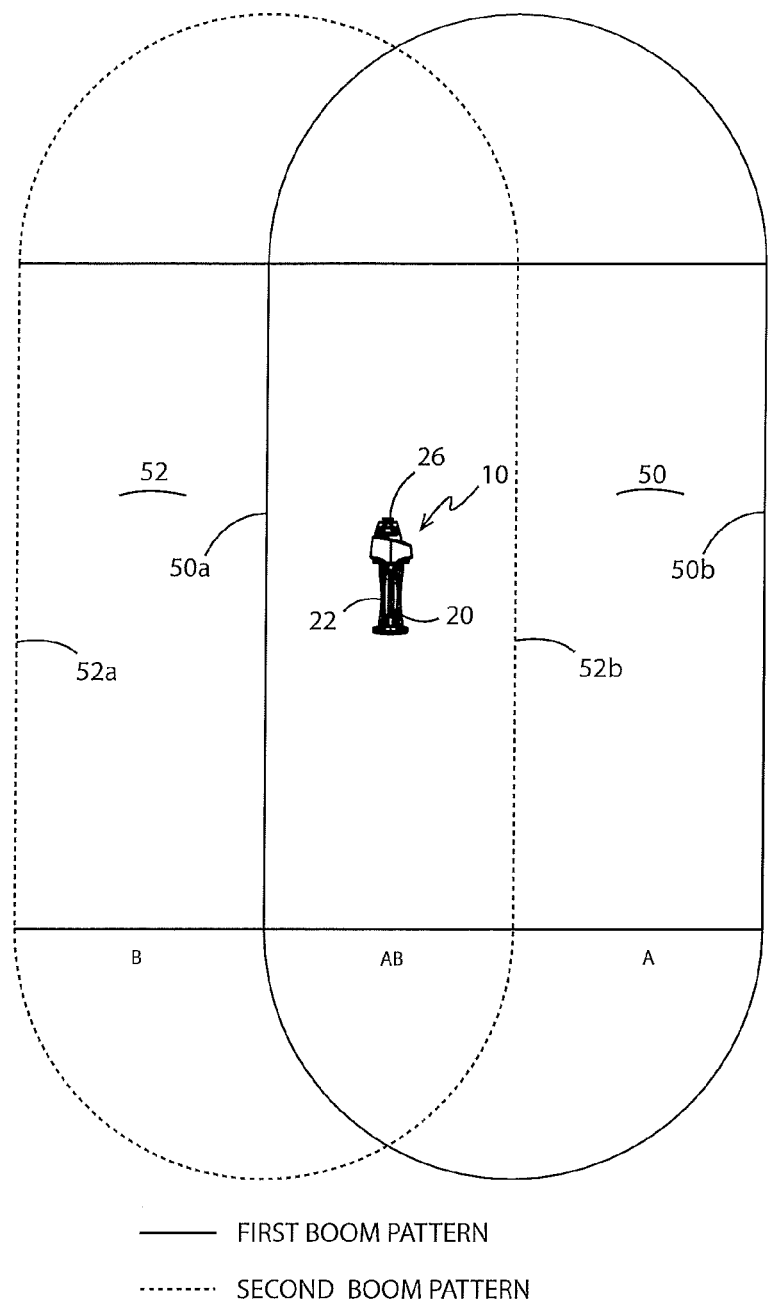
FIG. 15 is a top view of the sprinkler positioned on a lawn and showing the spray pattern from the sprinkler's left and right booms.
Figure 16:
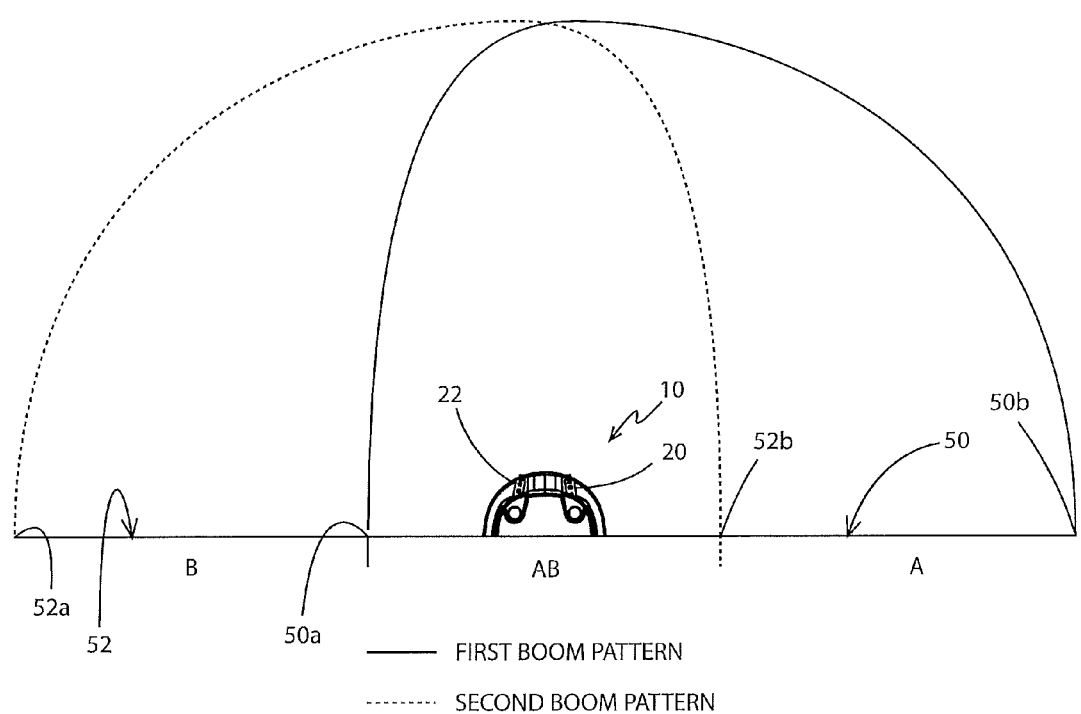
FIG. 16 is an end view of the sprinkler positioned on a lawn and showing the spray pattern from the sprinkler's left and right booms.

FIGS. 15 and 16 show the water flow pattern from sprinkler 10. If a typical water distribution pattern of a previously known single boom oscillating sprinkler is divided into segments that are roughly one third each of the overall area, there tends to be much more water applied to the ground surface in the two outside thirds of the pattern than in the center third thereof. In these previously known sprinklers there is a reversal of the oscillating boom at the outer sides of the watering pattern (i.e., at the two stall points in the oscillation). There is therefore a tendency for more water to fall in these two outer thirds of the watering pattern as the boom reaches the stall point and then waits for the gears to reverse the direction and start to come all the way back up again.

In the currently disclosed sprinkler 10, on the other hand, the first and second booms 20, 22 are geared so that they will oscillate in opposite directions to each other. First boom 20 is arranged to create a first spray pattern on a ground surface upon which sprinkler 10 is placed. This first spray pattern is identified in FIGS. 15 and 16 by the solid lines and extends from line 50a to line 50b. The first spray pattern is also identified by the letter "A". Second boom 22 is arranged to create a second spray pattern on the ground surface. This second spray pattern is identified in FIGS. 15 and 16 by the dashed lines and extends from line 52a to line 52b. The second spray pattern is also identified by the letter "B". The first spray pattern "A" and the second spray pattern "B" partially overlap each other on the ground surface. This overlapping spray pattern is located in a central region of the watering pattern and is identified in FIGS. 15 and 16 by the letters "AB". The central region "AB" is that area of the ground surface that is located between lines 50a and 52b.

In addition to applying water to central region "AB", first boom 20 also applies water to a first region 50 of the area of the ground surface outside of the central region "AB". This first region 50 extends between line 52b and line 50b. Line 50b represents an outer limit beyond which water from first boom 20 tends not to fall.

In addition to applying water to central region "AB", second boom 22 also applies water to a second region 52 of the area of the ground surface beyond the central region "AB". This second region 52 extends between line 50a and line 52a. Line 52a represents an outer limit beyond which water from second boom 22 tends not to fall.

As is evident from FIGS. 15 and 16, water from each of the first boom 20 and second boom 22 falls in central region "AB". Water from first boom 20 tends not to fall within second region 52 and water from second boom 22 tends not to fall within first region 50. Each of the first and second booms 20, 22 is therefore limited to only water their specific one of the first and second regions 50, 52 and the central region "AB". As a result of the design of sprinkler 10 there is additional watering in the central region "AB" (by both booms 20, 22). Sprinkler 10 has two additional stall points shown as 50a and 52b, relative to the previously known single oscillating boom sprinkler outer stall points (50b and 52a). These additional stall points create more watering in the central region "AB" due to the overlap. As a result of the additional watering in region "AB", sprinkler 10 creates a more even watering pattern. This is because previously known single boom oscillating sprinklers tend to apply much more water to the two outside thirds of the typical water distribution pattern as previously mentioned. Due to this more even watering pattern, it means that there is therefore a reduced requirement to overwater some region of the ground surface in order to adequately water other regions. Previously known sprinklers required drastic overwatering of some regions in order to adequately water other regions. Sprinkler 10 therefore may have a tendency to reduce water wastage and decrease the amount of time required to water particular ground surface regions. In addition to this, because the time required to water particular ground surface regions may be reduced, so may be the amount of water used. This results in sprinkler 10 mitigating the large "pooling affect" created by traditional single oscillating boom sprinklers found at 50b and 52a and once again creates a more even spray pattern by creating 4 more evenly spaced out pools which are smaller in water volume (52a, 50a, 52b, 50b).

It should be noted that the size of the watering pattern illustrated in FIGS. 15 and 16 may be adjusted by engaging the adjustable first and second limit stops 34, 36 on sprinkler 10. If the stops 34, 36 are moved inwardly toward each other then the distance between the outermost limits 50b and 52a of the pattern is decreased. If the stops 34, 36 are moved outwardly away from each other then the distance between the outermost limits 50b, 52a is increased. First and second limit stops 34, 36 limit or restrict the degree or extent to which the associated first boom 20 or second boom 22 is able to rotate outwardly away from the other of the first boom 20 and second boom 22.

It will be understood that instead of using hydraulic motor 28 to oscillate first and second booms 20, 22, other drive mechanisms powered by air, electricity, gasoline or any other means of actuation may be used in sprinkler 10.

It will further be understood that instead of a single motor 28 being used to oscillate first and second booms 20, 22, two motors may be utilized in sprinkler 10. If two motors are used, each motor would have its own limits stops and gears would link first and second booms 20, 22 together. In this type of configuration one motor might reach its limit stop first and reverse the direction of that motor. This could jamb the other boom. The use of one motor 28 with one set of limit stops helps to solve the potential issue that could be created if two motors are used. Using one motor 28 is also less expensive to manufacture sprinkler 10. Nonetheless, two motors could be utilized in sprinkler 10 if this was desired.

It will further be understood that while a single valve 38 is illustrated in the attached figures, two valves may be provided on sprinkler 10, with each of these two valves being used to reduce or shut off flow to one or both of the first and second booms 20, 22.

It should further be understood that instead of valve 38 being located in the housing 24 of motor assembly 16, a valve may be located in one or both of the first and second booms 20, 22 or in the bore 30 between motor 28 and water manifold 18. It will be understood that the sprinkler may have shut-off valves incorporated in the design in such a way that either both booms 20, 22 may disperse water or only one of the booms 20, 22 may disperse water.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. An oscillating sprinkler comprising:
   a frame;
   a first boom engaged with the frame;
   a second boom engaged with the frame; wherein the booms are oriented generally parallel to each other and each of the first and second booms rotates about an axis that extends along a length of the respective first or second boom; and wherein the first and second booms rotate in opposite directions to each other.

2. The oscillating sprinkler as defined in claim 1, wherein the first and second booms rotate in synchrony with each other.

3. The oscillating sprinkler as defined in claim 2, wherein a first one of the one or more limit stops restricts rotation of the first and second booms away from each other and a second one of the one or more limit stops restricts rotation of the first and second booms towards each other.

4. The oscillating sprinkler as defined in claim 1, further comprising one or more limit stops associated with each of the first boom and the second boom; and wherein the one or more limit stops restrict the degree of rotation of the first and second booms.

5. The oscillating sprinkler as defined in claim 4, wherein the one or more limit stops are adjustable.

6. The oscillating sprinkler as defined in claim 1, wherein the first boom defines a plurality of spaced-apart first openings through which water will flow; and the second boom defines a plurality of spaced-apart second openings through which water will flow; and wherein the first openings are positioned on the first boom in such a way that the first openings are out of alignment with the second openings on the second boom.

7. The oscillating sprinkler as defined in claim 1, further comprising a water manifold operatively engaged with the first and second booms.

8. The oscillating sprinkler as defined in claim 7, wherein the water manifold includes:
   a first gear operatively engaged with the first boom;
   a second gear operatively engaged with the first gear;
   a third gear operatively engaged with the second gear; and
   a fourth gear operatively engaged with the third gear and with the second boom; wherein the second and third gears are located between the first and fourth gears and the second and third gears are configured to rotate in opposite directions.

9. The oscillating sprinkler as defined in claim 8, wherein the third gear is a driven gear.

10. The oscillating sprinkler as defined in claim 8, wherein the water manifold further comprises a housing that defines a cavity and wherein the first gear, second gear, third gear and fourth gear are located within the cavity; and wherein water flowing through the cavity surrounds the first gear, second gear, third gear and fourth gear.

11. The oscillating sprinkler as defined in claim 10, wherein the housing is a watertight housing and water flows through the cavity of the housing under pressure to the first boom and to the second boom.

12. The oscillating sprinkler as defined in claim 10, wherein the first gear defines a first water channel that is in fluid communication with a channel in the first boom; and the fourth gear defines a second water channel that is in fluid communication with a channel in the second boom; and wherein water within the housing is caused to flow through the first water channel to the channel in the first boom and through the second water channel to the channel in the second boom.

13. The oscillating sprinkler as defined in claim 7, further comprising a motor operatively engaged with gears in the water manifold, said motor being actuated to rotate the first and second booms via the gears.

14. The oscillating sprinkler as defined in claim 13, wherein the motor is hydraulically actuated.

15. The oscillating sprinkler as defined in claim 13, wherein the motor is an impeller driven, geared motor and is configured to drive one of the gears of the water manifold.

16. The oscillating sprinkler as defined in claim 1, further comprising a valve operatively engaged with one or both of the first and second booms; wherein the valve is selectively engaged to shut off flow of water through one or both of the first and second booms.

17. The oscillating sprinkler as defined in claim 1, further comprising a valve operatively engaged with one or both of the first and second booms, wherein the valve is selectively engaged to reduce flow of water through one or both of the first and second booms.

18. The oscillating sprinkler as defined in claim 1, wherein the first boom is adapted to create a first spray pattern on a ground surface upon which the sprinkler is placed; and the second boom is adapted to create a second spray pattern on the ground surface; and wherein the first spray pattern and the second spray pattern partially overlap each other on the ground surface; and the overlapping first and second spray patterns apply water to a central region of an area on the ground surface.

19. The oscillating sprinkler as defined in claim 18, wherein the first boom's first spray pattern additionally applies water to a first region of the area on the ground surface; where the first region is adjacent one side of the central region; and wherein the second boom's spray pattern additionally applies water to a second region of the area on the ground surface; where the second region is adjacent an opposite side of the central region from the first region.

20. The oscillating sprinkler as defined in claim 19, wherein the first boom's first spray pattern tends not to cause water to fall within the second region of the area of the ground surface; and wherein the second boom's second spray pattern tends not to cause water to fall within the first region of the area of the ground surface.

* * * * *